United States Patent
Lee et al.

(10) Patent No.: US 7,176,970 B2
(45) Date of Patent: Feb. 13, 2007

(54) LIGHT SENSING PIXEL SENSOR AND METHOD

(75) Inventors: King F. Lee, Schaumburg, IL (US);
Austin Harton, Oak Park, IL (US);
Barry W. Herold, Barrington, IL (US);
Bei Tang, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 822 days.

(21) Appl. No.: 10/609,853

(22) Filed: Jun. 30, 2003

(65) Prior Publication Data

US 2004/0263654 A1    Dec. 30, 2004

(51) Int. Cl.
*H04N 5/335* (2006.01)
(52) U.S. Cl. ............................. 348/297; 348/308
(58) Field of Classification Search ........... 348/308, 348/297; 250/208.1
See application file for complete search history.

(56) References Cited

U.S. PATENT DOCUMENTS

| 5,822,468 A | 10/1998 | Forchheimer et al. |
| 2003/0058356 A1* | 3/2003 | DiCarlo et al. .......... 348/241 |
| 2003/0058360 A1* | 3/2003 | Liu et al. .................. 348/308 |
| 2003/0076432 A1* | 4/2003 | Luo et al. ................. 348/308 |
| 2005/0195300 A1* | 9/2005 | Krymski .................. 348/294 |
| 2006/0170796 A1* | 8/2006 | DeMonte et al. ........ 348/246 |

OTHER PUBLICATIONS

Guo, X;.; Erwin, M.; Harris, J. "A Time-Based Asynchronous Readout (TBAR) CMOS Image Sensor For High-Dynamic Range Applications"IEEE Sensors 2000 Conference.

\* cited by examiner

*Primary Examiner*—Tuan Ho
(74) *Attorney, Agent, or Firm*—James A. Lamb

(57) ABSTRACT

A photodetector (105) generates an electrical signal that has a value that changes approximately linearly at a rate that is proportional to an amount of light intensity incident on a photodetector since a most recent reset command was received at a reset input of the photodetector. A measurement circuit (110) generates a comparison state that is based on a comparison of the value of the photodetector signal to a reference signal in response to one of a plurality a sample pulses. A control circuit (160) generates the plurality of sample pulses at non-uniform time intervals and generates an elapsed time as an accumulation of the non-uniform time intervals occurring from the reset command to a change of the comparison state. In one embodiment, the reciprocal of an accumulated duration of the non-uniform time intervals is a linear function of a number of time intervals after the reset command.

14 Claims, 5 Drawing Sheets

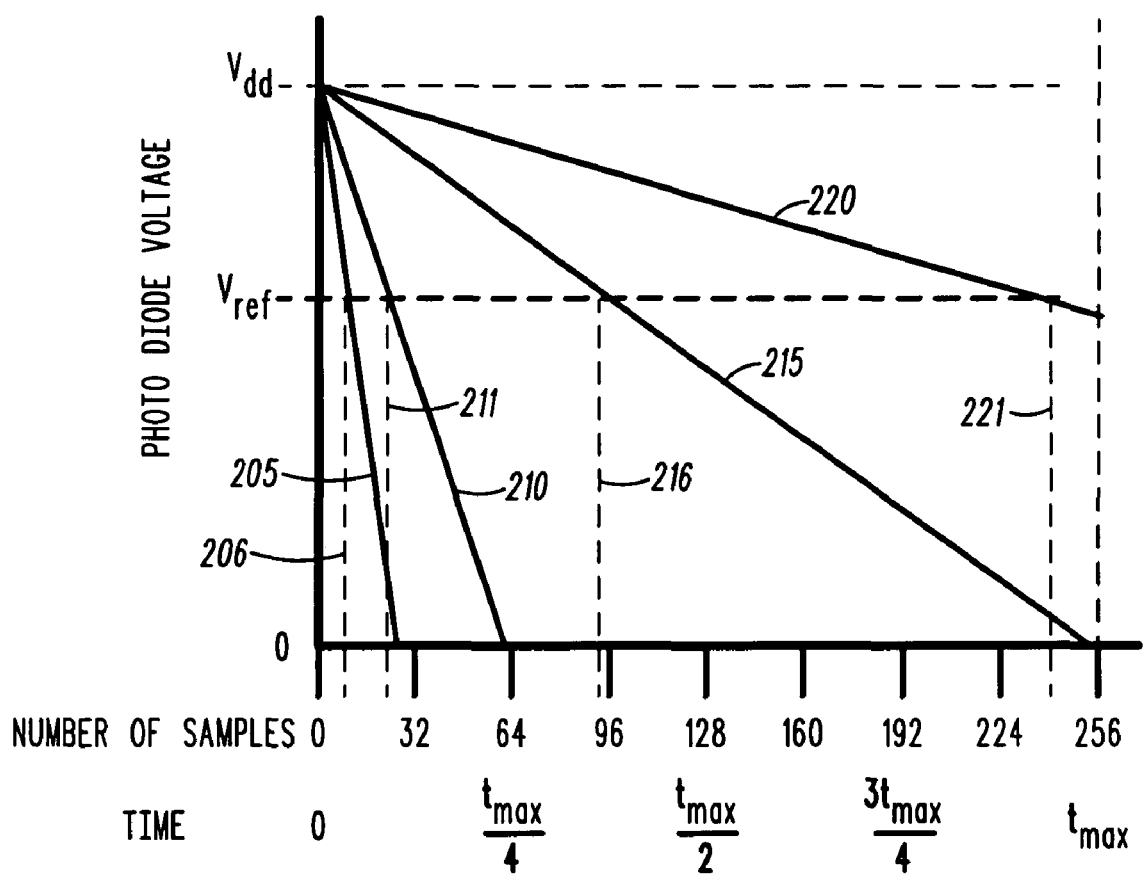
FIG. 2 —PRIOR ART—

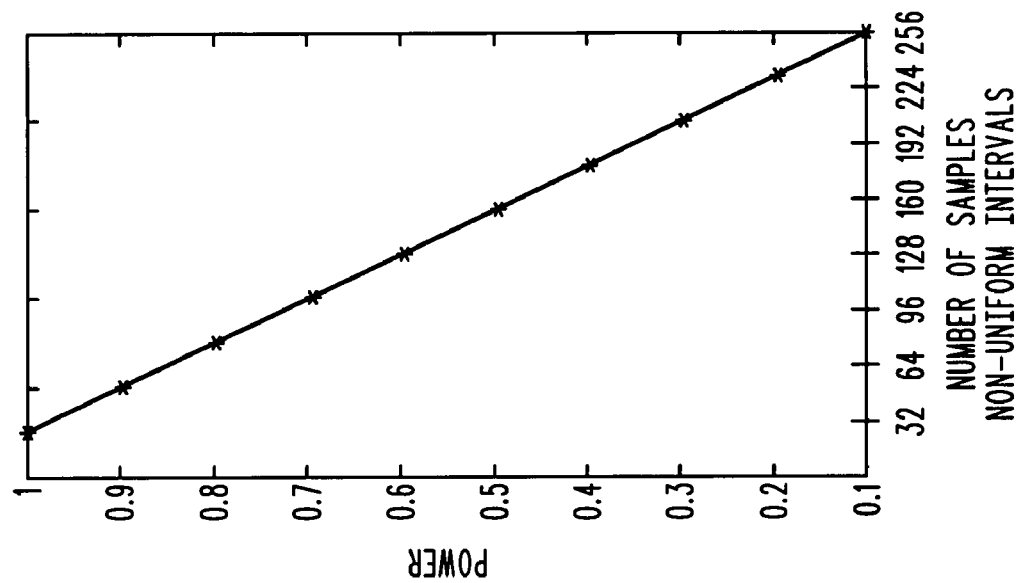
FIG. 4
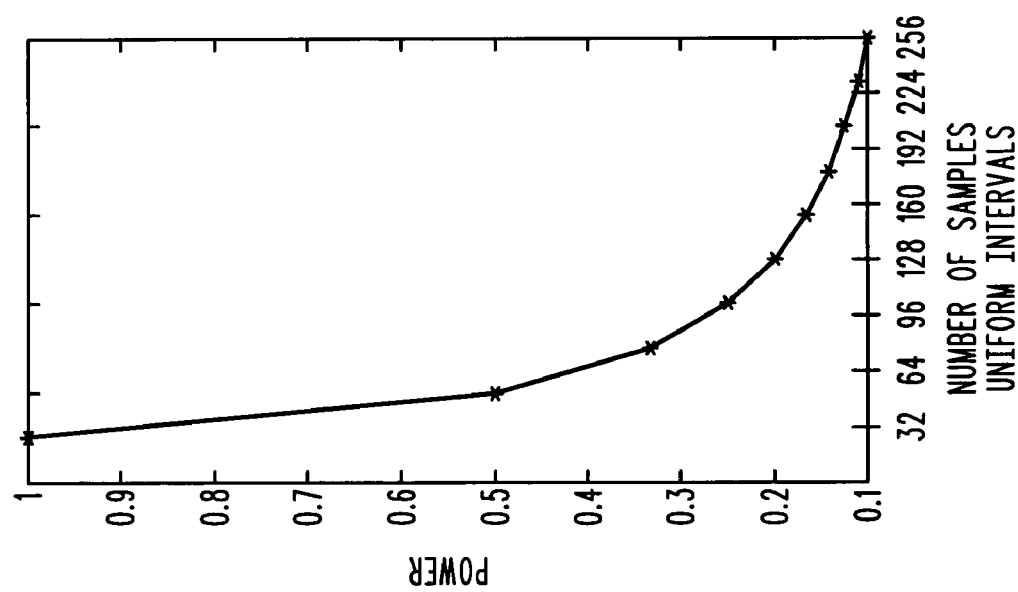
FIG. 3 —PRIOR ART—

US 7,176,970 B2

LIGHT SENSING PIXEL SENSOR AND METHOD

This application is related to a co-pending application entitled "Time Integrating Pixel Sensor" U.S. Ser. No. 10/012,947 filed on Dec. 10, 2001, assigned to the assignee of the instant application.

FIELD OF THE INVENTION

This invention is related to imaging devices, and more particularly to image sensors using pixels comprising photodetectors used to generate a frame image.

BACKGROUND

Recent descriptions of electronic architectures for time based pixel light sensors have been descriptions of digital implementations. In these implementations, instead of converting an analog photo detector voltage at the end of a fixed integration time to a digital value, time-based sensors measure a duration for the photo detector voltage to reach a reference voltage after a reset. This duration is directly related to a light intensity that is incident on the photo detector, and can therefore be used to determine a digital value representing the measured power of the light incident on the photodetector.

In conventional digital implementations, the time resolution and voltage resolution are constants, and they are referred herein to as single-resolution systems. Single-resolution sensors have a number of performance limitations. For example, when the photo detector voltage is sampled and compared to a fixed reference voltage at equally spaced time intervals; i.e., at Ts, 2Ts, 3Ts, in order to determine the duration for the photo detector voltage to reach a reference voltage after a reset, the transfer function of the time duration output and the light intensity input is 1/x, which is non-linear, and results in a non-uniform resolution of the measurement of the light intensity. The nonlinear 1/x transfer function will compress the image brightness, which is undesirable for most visual applications. The ability to resolve different power levels at high light intensity is also significantly limited by the single time resolution in these systems.

Thus, an improved technique for digitally measuring light intensity in a light sensing pixel is needed.

BRIEF DESCRIPTION OF THE DRAWINGS

The present invention is illustrated by way of example and not limitation in the accompanying figures, in which like references indicate similar elements, and in which:

FIG. 2 shows a graph that includes plots of photodiode voltages versus time for four different light intensities, in accordance with time integrating circuits used in conventional light imaging devices;

FIG. 3 shows a graph that includes a plot of the relationship of the intensity (power) of the light to the number of time intervals, in accordance with conventional light imaging devices.

FIG. 4 shows a graph that includes a plot of the relationship of the intensity (power) of the light to the number of sample pulses, in accordance with the preferred embodiment of the present invention;

Figure 1:
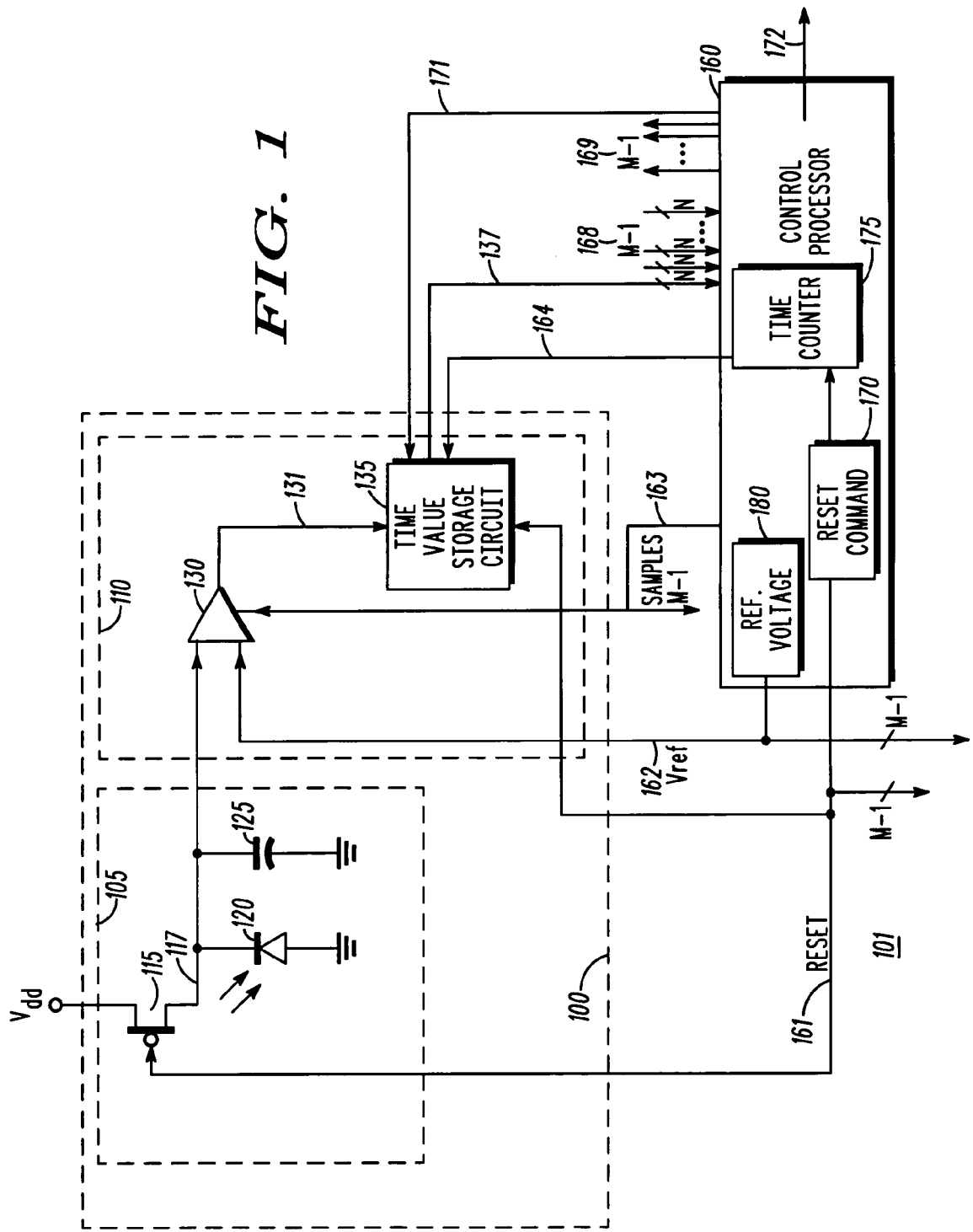
FIG. 1 shows a schematic and block diagram of a light imaging device, in accordance with the preferred embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular light sensing pixel sensor and method in accordance with the present invention, it should be observed that the present invention resides primarily in combinations of method steps and apparatus components related to light sensors. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a schematic and block diagram of a light imaging device 101 is shown, in accordance with the preferred embodiment of the present invention. The light image device 101 comprises an array of M pixels (not shown in FIG. 1) and a control processor 160. Each pixel in the M pixels array is a light sensing pixel structure 100 that comprises a photodetector 105 and a pixel measurement circuit 110. The photodetector 105 preferably comprises a photosensitive diode (photodiode) 120 characterized by a reverse bias junction capacitance 125, which are modeled as being coupled in parallel as shown in FIG. 1. The photodetector 105 further comprises a reset transistor 115 that has an output coupled to the anode of the photosensitive diode 120, a controlled input coupled to a source voltage, $V_{dd}$, and a control input coupled to a reset signal line 161. The cathode of the photodiode is coupled to a sink voltage that is preferably a ground reference, $V_{ss}$, of the source voltage, $V_{dd}$. When a reset command is generated by the control processor 160, the reset transistor 115 conducts and photodiode 120 is reverse biased by the amount $V_{dd}-V_{ss}$, which is stored as a charge in the reverse bias junction capacitance 125. The reset command is characterized in this example by a voltage pulse on the reset signal line 161 that goes "low" (negative with reference to $V_{dd}$; typically to a voltage near $V_{ss}$), and then returns to a "high" voltage (typically near $V_{dd}$). When the terminology "after a reset command", or "since a most recent reset command", or the like, is used herein, reference is being made to the time at which the reset command is completed, which in this example is when it returns to the high voltage. After the reset command, the reset transistor 115 turns off (becomes very high impedance) and the charge in the reverse bias junction capacitance 125 starts to dissipate through the junction of the photodiode 120 such that the reverse bias junction voltage changes at a rate determined by an intensity of the light that is incident on the junction of the photodiode 120. The photosensitive diode 120 is preferably of a type that is compatible with complementary metal oxide semiconductor (CMOS) fabrication technology, but alternatively can be of any type for which an output signal of the photodiode 120 is at least monotonically related to the light intensity. For a photodiode that is compatible with CMOS technology, the rate of change of the reverse bias junction voltage is essentially linear with reference to the light intensity over a broad range of light intensities, until the junction voltage becomes a value near zero, but some of the benefits of the present invention will be achieved when the rate of change of the reverse bias junction voltage can be modeled by a function that is monotonic over a predetermined useful range of voltage. It will be appreciated that the high and low states of the reset line 161, as well as all other logic signals described herein, can be reversed by the use of appropriate types of transistors, biasing and logic.

The pixel measurement circuit 110 preferably comprises a comparator 130 and a time value storage circuit 135, and the control processor 160 preferably comprises a reset command generator 170, a time generator 175, and a reference voltage generator 180. The reverse bias junction voltage is coupled by photodetector output signal line 117 to the comparator 130, where the value of the reverse bias junction voltage is compared to a reference voltage, $V_{ref}$ coupled to another input of the comparator 130 by signal line 162 from the reference voltage generator 180 in the control processor 160. The comparator 130 is preferably a gated comparator, for example, a tristate type of device that is off except during a predefined state (either a high state or a low state) of a sample pulse that is generated by the control processor 160 and coupled to the comparator by signal line 163. Each time a sample pulse is received by the comparator 130, a comparison state of the comparator 130 is coupled to the time value storage circuit 135 by signal line 131. This state is, for example, a high when the reverse bias junction voltage is greater than the reference voltage, $V_{ref}$, and is otherwise a low. The reset command is coupled from the control processor 160 to the time value storage circuit 135 in each of the M light sensing pixel structures 100 by signal line 161. When a reset command is received by the time value storage circuit 135, the time value storage circuit 135 begins storing the most recent state of the output of the comparator 130 in a comparison state register. When a new state of the output of the comparator 130 is received by the time value storage circuit 135 that is different than the most recently stored state, the time value storage circuit 135 stores an N bit time value that is generated by the time generator 175, which is coupled from the time generator 175 to the time value storage circuit 135 in each of the M light sensing pixel structures 100 by signal lines 164. In accordance with the preferred embodiment of the present invention, the time generator 175 generates an eight bit count of periodic clock pulses (i.e., N is 8 in this example) that have occurred since a most recent reset command has been received from the reset command generator 170. Thus, the time value coupled to the time value storage circuit is an elapsed time from the reset command to a change of the comparison state, which in turn is a measure of the power of the light incident on the photodetector. A unique aspect of the present invention is that the time intervals between the sample pulses are non-uniform, as will be explained in more detail below.

The reset command coupled to the time generator 175 is the same reset command coupled by signal line 161 to the reset transistor 115 of the photodiode 120 in each pixel. The reset commands are preferably generated periodically at the beginning of reset intervals that are not greater than the maximum time counted by the time generator 175, although the reset commands need not be periodic to achieve the benefits of the present invention. The time between reset commands may be greater than the reset interval, in order to allow for uploading of data from all the pixels before a new reset command is generated.

The signal lines 161, 162, 163, and 164 are coupled to comparable inputs within the other M–1 pixels in the light imaging device 101.

At a completion of a reset interval, the control processor 160 sends a recall (or upload) command to the time value storage circuit 135 on signal line 171, in response to which the time value storage circuit 135 couples the stored time value (the elapsed time, in accordance with the preferred embodiment of the present invention) to the control processor 160 on N bit signal lines 137. The control processor 160 sends similar upload commands to the other M–1 pixels of the light imaging device 101 over signal lines 169 and receives the time values from the other M–1 pixels on N*(M–1) signal lines 168. It will be appreciated that the time values could be transferred to the control processor 160 on a set of multiplexed signal lines, with appropriate logic circuits, signal lines, and command signals. The plurality of elapsed times received from the M pixels are then used to generate a video frame, in a conventional manner, which is coupled on signal line 172 to a circuit or device that uses the video frame.

In a first alternative embodiment, the time value storage circuit 135 includes a counter instead of a storage register (as can be used in the preferred embodiment), and is coupled to signal line 163, from which the sample pulses are received. The time value storage circuit 135 determines the change of the comparator states, as described above, and also counts the number of periodic clock pulses that occur from the most recent reset command to the change of state of the comparator. At a completion of a reset interval, the control processor 160 sends a recall (upload) command to the time value storage circuit 135 on signal line 171, in response to which the time value storage circuit 135 couples the stored time value (the count of periodic clock pulses), in accordance with this first alternate embodiment of the present invention, to the control processor 160 on N signal lines 137. The control processor 160 sends similar upload commands to the other M–1 pixels of the light imaging device 101 over signal lines 169 and receives the time values from the other M–1 pixels on N*(M–1) signal lines 168. The control circuit converts the count of periodic clock pulses from each pixel to an elapsed time by using a conventional technique such as a look-up table, and the plurality of elapsed times associated with the M pixels are then used to generate an image frame, in a conventional manner, which is coupled on signal line 172 to a circuit or device that uses the image frame. In this first alternative embodiment, signal line 164 is not needed, but this is traded off for the look-up table conversion process.

It will be appreciated that variations to the logic and electronic circuitry that are well known to one of ordinary skill in the art could be used that produce functions as described herein that provide the benefits of the present invention. For example, the time value could alternatively be transferred from the control processor 160 to the time value storage circuit 135 serially, and that it could be alternatively be transferred using a common bus, with appropriate logic circuits, signal lines, and command signals. As another example, the comparator 130 could continuously generate the comparison state, the sample pulse signal line 163 could be coupled to the time value storage circuit 135 instead of the comparator 130, and the time value storage circuit 135 could determine the comparison state at each sample pulse.

Referring to FIG. 2, a graph shows plots of photodiode voltages 205, 210, 215, 220 versus time for four different light intensities, in which the light intensity for the plot 205 is greater than that of plot 210, the light intensity for the plot 210 is greater than that of plot 215, and the light intensity for the plot 215 is greater than that of plot 220. A fixed reference voltage, $V_{ref}$, is indicated on the vertical axis. The values at which the photodiode voltages 205, 210, 215, 220 cross the reference voltage, $V_{ref}$, are indicated by intercept lines 206, 211, 216, 221, respectively. In this graph, the horizontal axis shows elapsed time and shows the occurrence of 256 sample intervals of equivalent duration, which is in accordance with time integrating circuits used in conventional light imaging devices. It will be appreciated that the intensity of the light is indicated by the slope of the plots, and the slope of the plots is related to elapsed time by $(V_{dd}-V_{ref})/t$, where t is the elapsed time, and that therefore the relationship of the intensity of light to the number of uniform time intervals between sample pulses in conventional light imaging devices is proportional to the reciprocal of the elapsed time and is therefore highly nonlinear. This is illustrated by the graph in FIG. 3, where the relationship of the intensity (power) of the light to the number of time intervals is plotted in accordance with conventional light imaging devices. The use of this relationship to determine an elapsed time also results in very poor resolution of the time measurement at high intensities compared to the resolution at low intensities, often resulting in an image that is inaccurate at the high intensity region.

Referring to FIG. 4, a graph shows a plot of the relationship of the intensity (power) of the light to the number of sample pulses, in accordance with the preferred embodiment of the present invention. Here, the number of sample pulses is linearly related to the intensity of the light. To accomplish this, the control processor 160 generates the sample pulses at non-uniform time intervals such that the reciprocal of a cumulative duration of the non-uniform time intervals, $t_n$, is a linear function of a number of time intervals, n, after the reset command. To achieve this relationship, the control processor 160 may generate the sample pulses at non-uniform time intervals so that the accumulated duration, $T_n$, of the time intervals is $T*N/(N-n+1)$, wherein T is the duration of a first interval after the reset command, n is a number of the time intervals after the reset command, and N is a maximum number of sample pulses. For example, if the first interval is 10 microseconds, and the maximum number of sample pulses is 256, then the accumulated duration at the nth pulse is $2560/(257-n)$ microseconds, or a maximum duration of 2.560 milliseconds. This relationship can also be expressed more generally as: The non-uniform time intervals are generated such that the reciprocal of an accumulated duration, $1/T_n$, of the time intervals, $t_n$, is a linear function of a number of time intervals, n, after the reset command.

Figure 5:
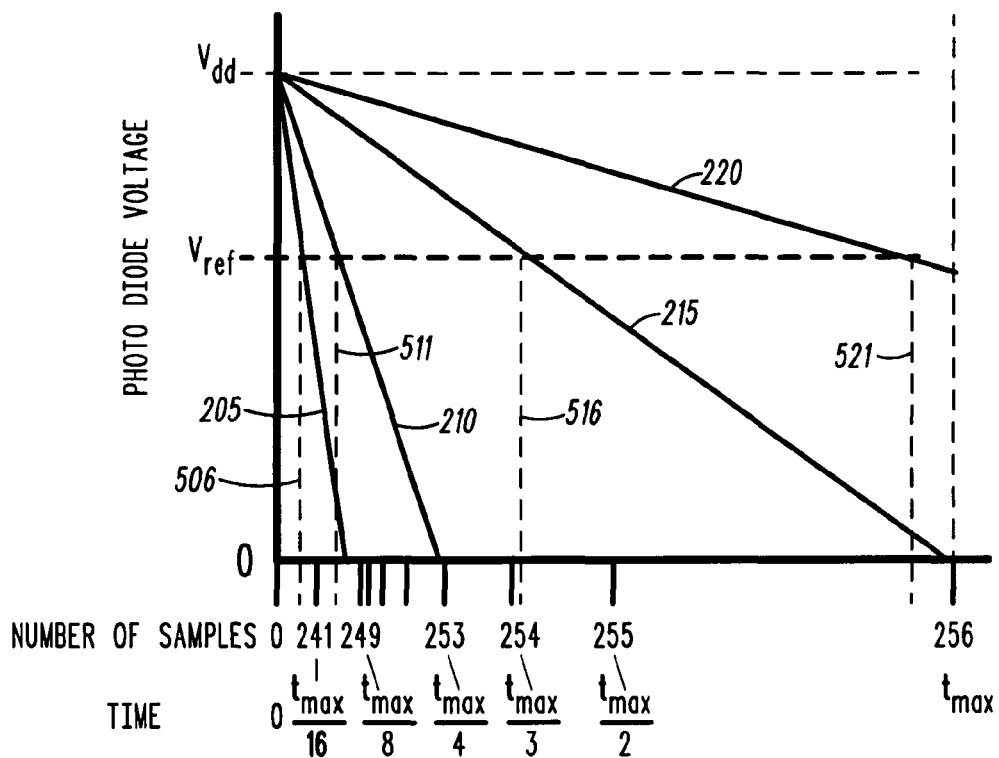
FIG. 5 shows a graph of photodiode junction voltage versus time in which four photodiode junction voltage plots are shown, in accordance with the preferred embodiment of the present invention.

This relationship is illustrated in FIG. 5, which is a graph of photodiode reverse bias voltage versus time in which the same four photodiode reverse bias voltage plots 205, 210, 215, 220 are shown, in accordance with the preferred embodiment of the present invention. As in FIG. 2, the horizontal axis shows elapsed time since a most recent reset command, with occurrences of some of the sample pulse counts also being shown. A fixed reference voltage, $V_{ref}$, is indicated on the vertical axis. For the example just cited, $T_{max}$, at the right side of the horizontal axis, is 2.560 milliseconds. The time intercepts for these four plots are also shown, as respective intercepts 506, 511, 516, and 521. It can be seen from FIG. 5 that the time intervals are very small at the left end of the time axis, where the slopes of the plots are very high (negatively), and large at the right side of the time axis, where the slopes of the plots are very low (negatively), so that the resolution of the elapsed time measurement made by the control circuit tracks the slope (intensity of the light) linearly. In some applications, it may be preferable to use a different relationship. In the example just cited, the first time interval occurs at 10 microseconds, but the next 128 time intervals are less than 0.15 microseconds each. It may be desirable to make the first 128 time intervals a uniform 0.15 microseconds (for an accumulation of 18.75 microseconds) and then start increasing them according the above formula. In another example, a logarithmic function that is based on accumulated time intervals scaled by of 256/log(256), 256/log(255), . . . , 256/log(3), 256/log(2) and the resulting transfer function will have a logarithmic response. In yet another example, when there is a light intensity range within which there is a specific need for higher resolution time measurements, then the duration of the time increments could be made minimum at times related to intensities within the range, and longer at times related to intensities outside the range. So it can be seen that any of a wide variety of non-uniform time functions that provide accumulated intervals that increase monotonically can be used in accordance with the preferred embodiment of the present invention.

Figure 6:
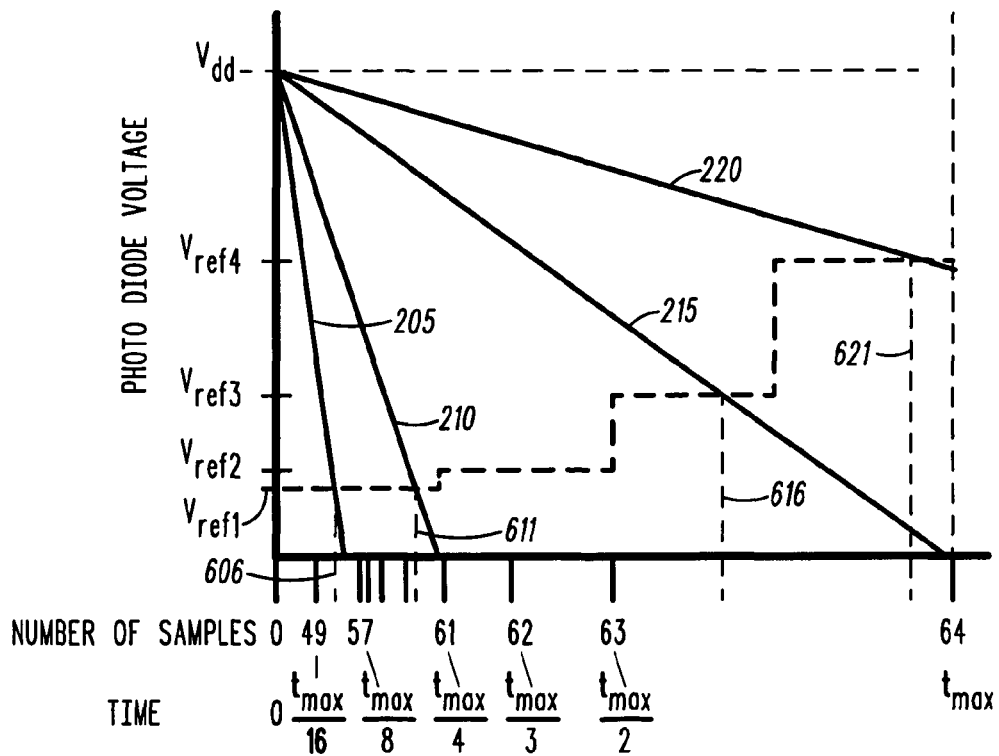
FIG. 6 shows a graph that includes plots of photodiode voltages versus time for four different light intensities, in accordance with a second alternative embodiment of the present invention.

Referring to FIG. 6, a graph shows plots of the photodiode voltages 205, 210, 215, 220 versus time for four different light intensities, in accordance with a second alternative embodiment of the present invention. As in FIG. 2, the horizontal axis shows elapsed time since a most recent reset command, with occurrences of some of the sample pulse counts also being shown. The essential difference between the preferred embodiment and this second alternative embodiment is that the control processor 160 generates the reference voltage, $V_{ref}$, as a stepped, time varying value, as illustrated in FIG. 6 which shows four voltage reference values, $V_{ref1}$, $V_{ref2}$, $V_{ref3}$, $V_{ref4}$. Each voltage reference value in this example remains constant for a plurality of non-uniform time intervals, and the change between voltage reference values increases as the non-uniform time intervals become longer, which allows more settling time for the larger voltage changes. However, a voltage step could last for as little as one time interval, and the amount of voltage change could be constant in some embodiments. Respective intercept times 606, 611, 616, 621 are shown for the photodiode voltage plots 205, 210, 215, 220. The sample pulses are still generated in a non-uniform manner, as in the preferred embodiment, but by using a time varying voltage reference in conjunction with the non-uniform time intervals, better time resolution is achieved by having lower reference voltage values for the high intensity plots, because the intercept times 606, 611 are now longer than the respective intercept times 506, 511 described with reference to FIG. 4. Accordingly, it may be practical in this second alternative embodiment to reduce the quantity of samples times. This is illustrated in FIG. 6 by the use of 64 sample times instead of 256. The actual quantity of sample times and the reference voltages can be selected to optimize a particular set of parameters including, for example, the sensitivity of the photodiodes, the desired frame rates, the processing speeds of the logic used, and the type of application in which the frame is used, but the voltages of the steps preferably increases with elapsed time. The second alternative embodiment of the present invention can be embodied using the time value determination technique of the preferred or the first alternative embodiment.

Figure 7:
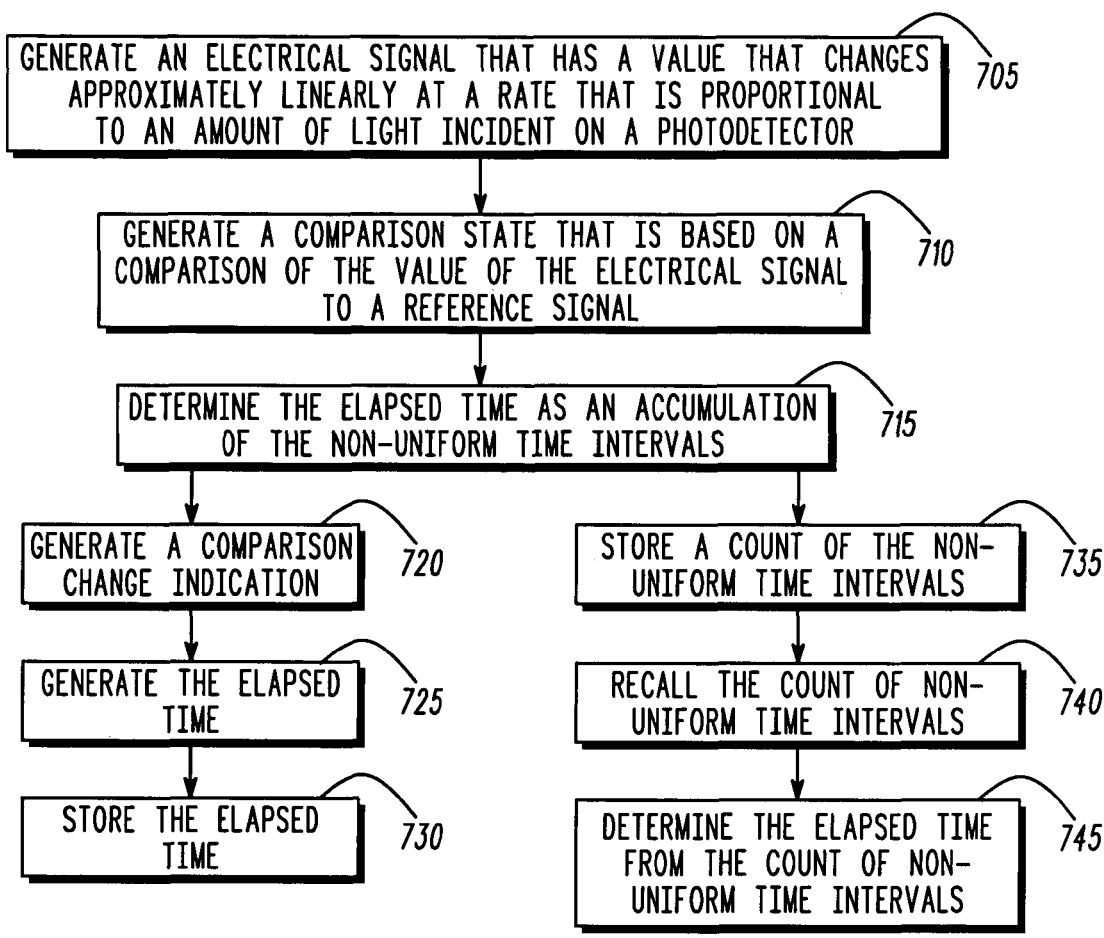
FIG. 7 shows a flow chart of a method for determining a light intensity measurement from a pixel sensor in the form of an elapsed time, in accordance with embodiments of the present invention.

Referring now to FIG. 7, a flow chart shows some steps of a method for determining a light intensity measurement from a pixel sensor in the form of an elapsed time, using the techniques described in this disclosure. At step 705, an electrical signal is generated that has a value that changes essentially linearly at a rate that is proportional to an amount of light intensity incident on a photodetector since a most recent reset command was received at a reset input of the photodetector. A comparison state is generated at step 710 that is based on a comparison of the value of the electrical signal to a reference signal in response to one of a plurality a sample pulses. The elapsed time is determined at step 715 as an accumulation of the non-uniform time intervals occurring from the reset command to a change of the comparison state. In accordance with the preferred embodiment of the present invention, a comparison change indication is generated at step 720 when a new value of the comparison state is different from a most recent value, the elapsed time is generated at step 725 in response to the comparison change indication, and the elapsed time is stored at step 730. In accordance with the first alternate embodiment of the present invention, a count of the non-uniform time intervals since the most recent reset command is stored at step 735 when a new value of the comparison state is different from a most recent value, the count of non-uniform time intervals is recalled at step 740, and the elapsed time is determined from the count of non-uniform time interval at step 745.

It will be appreciated that by allowing finer time resolution at a high intensity region or other regions of interest in a light sensing device, we can improve the accuracy of the intensity measurements in these regions, and that by allowing non-uniform (variable) time resolution, we can achieve a linear transfer characteristic by having 1/t time steps. Other interesting and useful transfer characteristics can be implemented by using non-uniform time intervals (or resolution) without requiring a time-varying reference voltage. This is very attractive for low cost applications because it eliminates the need of a digital-to-analog converter (DAC) for generating the time-varying reference voltage that is used in fixed duration sensing devices. A technique using non-uniform time intervals and a varying reference voltage may be advantageous in some applications.

It will be further appreciated that the benefits described as being derived from the embodiments of the present invention described herein accrue to a variety of displays, such as chromatic displays in which the light sensing pixel structures 100 are arranged in pixel groups that are sensitive to different light bands, and displays that respond to ultraviolet light and/or visible light.

Pixel sensing devices as described herein could be included in complicated systems-on-a-chip that include, for example an essentially complete cellular radio camera, or light imaging devices that are used in a very wide variety of electronic devices, including consumer products ranging from full function video cameras to small frame capture imagers for internet communications; military products such as night vision imagers and target imagers; and commercial equipment ranging from television broadcast cameras to robots to simple pieces of test equipment, just to name some types and classes of electronic equipment.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "plurality", as used herein, is defined as two or more than two. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/ dynamic load library and/or other sequence of instructions designed for execution on a computer system. A "set" as used herein, means a non-empty set (i.e., for the sets defined herein, comprising at least one member)

What is claimed is:

1. A pixel sensor, comprising:
a photodetector that generates an electrical signal having a value that changes monotonically at a rate that is proportional to an amount of light intensity incident on the pixel sensor since a most recent reset command was received at a reset input of the photodetector;
a pixel measurement circuit that generates a comparison state based on a comparison of the value of the photodetector signal to a reference signal in response to one of a plurality of sample pulses; and
a control circuit that generates the plurality of sample pulses at non-uniform time intervals, generates an N bit time value, generates reset commands, and generates the reference signal, wherein the control circuit determines an elapsed time from the reset command to a change of the comparison state, the elapsed time being an accumulation of the non-uniform time intervals.

2. The pixel sensor according to claim 1, wherein the pixel measurement circuit comprises:
a comparator that generates the comparison state; and
a time value storage circuit that generates a comparison change indication and the N bit time value generated by the control circuit is stored therein until recalled by the control circuit.

3. The pixel sensor according to claim 1, wherein the pixel measurement circuit comprises:
a comparator that generates the comparison state; and
a time value storage circuit that stores a count of the non-uniform time intervals since the most recent reset command, wherein the time value storage circuit couples the count of the non-uniform time intervals to the control circuit, wherein the control circuit determines the elapsed time from the count of non-uniform time intervals.

4. The pixel sensor according to claim 1, wherein the control circuit generates the non-uniform time intervals such that the reciprocal of an accumulated duration, $1/T_n$, of the time intervals, $t_n$, is a linear function of a number of the non-uniform time intervals, n, after the reset command.

5. The pixel sensor according to claim 1, wherein the control circuit generates the non-uniform time intervals so that their accumulated duration monotonically increases as the number of non-uniform time intervals after a reset command increases.

6. The pixel sensor according to claim 1, wherein the control circuit generates the non-uniform time intervals so that an accumulated duration of the non-uniform time intervals is $T*N/(N-n+1)$, wherein T is the duration of a first non-uniform time interval after the reset command, n is a number of the time intervals after the reset command, and N is a maximum number of time sample pulses.

7. The pixel sensor according to claim 1, wherein the control circuit generates the non-uniform time intervals with minimum duration intervals occurring during a time range corresponding to a first light intensity range and otherwise generates longer time intervals.

8. The pixel sensor according to claim 1, wherein the control circuit generates the reference signal as a voltage that has an essentially constant value between reset commands.

9. The pixel sensor according to claim 1, wherein the control circuit generates the reference signal as a voltage that has a time varying value between reset commands.

10. The pixel sensor according to claim 9, wherein the control circuit generates the reference signal as a voltage that has a series of voltage steps.

11. The pixel sensor according to claim 9, wherein the control circuit generates the reference signal as a voltage that has a series of non-uniform voltage steps.

12. A method for determining an intensity of light incident on a pixel sensor, comprising:

generating an electrical signal that has a value that changes approximately linearly at a rate that is proportional to an amount of light intensity incident on a photodetector since a most recent reset command was received at a reset input of the photodetector;

generating a comparison state that is based on a comparison of the value of the electrical signal to a reference signal in response to one of a plurality a sample pulses; and determining an elapsed time as an accumulation of non-uniform time intervals occurring from a reset command to a change of the comparison state.

13. The method according to claim 12, further comprising:

generating a comparison change indication when a new value of the comparison state is different from a most recent value;

generating the elapsed time in response to the comparison change indication; and storing the elapsed time.

14. The method according to claim 12, further comprising:

storing a count of the non-uniform time intervals occurring since the most recent reset command when a new value of the comparison state is different from a most recent value;

recalling the count of non-uniform time intervals; and determining the elapsed time from the count of non-uniform time intervals.

* * * * *